Dec. 9, 1952   P. J. CADE ET AL   2,621,239
HEAT DETECTOR FOR AIRCRAFT
Filed Aug. 22, 1950   2 SHEETS—SHEET 2

Inventors
PHILLIP J. CADE
DONALD J. MACDOUGALL
By M C Metcalf
Attorney

Patented Dec. 9, 1952

2,621,239

UNITED STATES PATENT OFFICE 2,621,239

HEAT DETECTOR FOR AIRCRAFT

Phillip J. Cade, Winchester, and Donald J. Mac-Dougall, Framingham, Mass., assignors to Photoswitch, Incorporated, Cambridge, Mass., a corporation of Massachusetts Application August 22, 1950, Serial No. 180,881

9 Claims. (Cl. 177—311)

This invention relates to fire prevention in vehicles such as aircraft and, particularly, to the detection of excessive heat in the engine area.

Fire in the air, always a serious hazard in flying, has become one of the chief causes of aircraft accidents and fatalities. The increasing seriousness of the fire hazard is due to factors such as the increasing complexity of the modern airplane, the use of higher octane fuels, high altitude flying, and, in particular, the introduction of the jet engine. The device here disclosed, while useful on many types of vehicles, is especially adapted to the conditions peculiar to jet aircraft. A jet engine generates considerably more heat than the reciprocating type, and efficiency considerations require that the engine be operated at as high a temperature as the metal parts can withstand. The engine itself is ordinarily mounted in a metal shroud which is separated from the skin structure of the airplane by a narrow air space. The flow of air through this space is depended on for cooling. These engines are particularly susceptible to defects in operation, such as mechanical failure, overloading, faulty combustion, or blocking of the air passage, which, unless promptly detected, are likely to result in serious damage to the surrounding structure, either by fire or by excessively high temperatures. The shroud is vulnerable to "hot spots," or localized overheating from these causes, and in many cases the shroud may be burned through in one spot before any general temperature rise has occurred. When fire occurs in the engine area the pilot often has no alternative but to shut off the engine and attempt a forced landing. For this reason fire prevention is fully as important as prompt fire detection. In many cases, for example when the overheated condition is the result of operating the engine at full throttle too long in a climb, the pilot, if promptly warned of the excessive temperature rise, can prevent damage simply by throttling down the engine and reducing the rate of climb until the engine cools off.

Several prior devices have been developed for overheat detection on jet aircraft. These devices are of two general types, the thermocouple and thermostatic type. Because of the high temperature conditions, the thermocouple is the only type suitable for mounting directly on the shroud, the thermostatic type being normally mounted in the space between the shroud and the aircraft structure. Since both types are operated by the ambient temperature rise at the point where they are mounted, a large number of units are required to supervise the engine area adequately. Coverage of the area must be balanced against weight considerations, and, at best, only partial protection is possible. In many cases the shroud has been burned through at a "hot spot" before the heat detectors have operated. Both types of detectors are also subject to considerable lag in response, an undesirable characteristic for any situation in which delay may be fatal. A third type of detector sometimes used, employing a fusible element, is subject to the same limitations as the other two, and is further objectionable because it is destroyed in operation and must be replaced each time an alarm occurs.

The object of this invention is to provide a device which instantly and reliably detects an overheated condition, which gives an indication when the overheated condition is over, which is suitable for repeated operation, and which fully protects the entire engine area by means of a relatively small number of detecting elements.

The device consists, in general, of a detecting element which yields an electrical signal in response to either radiated or conducted heat, an electronic amplifier circuit which amplifies signals from the detecting element, a balancing network which eliminates the effects of line voltage fluctuations, and an output circuit which operates an alarm or indicating device. The signalling device, for example, an indicator light, may be remotely mounted on the instrument panel of the airplane. The detecting element employed is a three electrode lead sulphide photocell of the type illustrated in co-pending application, Serial No. 51,709, filed September 29, 1948, now Patent No. 2,553,420, issued May 15, 1951 by Raymond H. McFee. The photocell has three electrodes lying in contact with a semi-conductive lead sulphide film which becomes more conductive when exposed to radiation, particularly radiation of frequencies in the red and infrared ranges. The three electrodes define two paths of equal length across the film. One path is masked by an opaque shield and the other path exposed to the radiation. Conducted heat, or ambient temperature rise, affects the conductivity of both paths equally, but only one path is affected by radiated heat. The type of detector being responsive to heat radiation, rather than temperature rise, is preferably mounted in a cool part of the area to be supervised, and so is not as likely as other types to be damaged or destroyed when an overheat condition occurs. A number of detecting elements are used in connection with a common amplifier and provision is made for varying independently the sensitivity of each detecting branch. The circuit is also arranged so that the failure or short-circuit of one of the detecting elements does not interfere with operation of those remaining. The device contains no moving parts and its operation is thus unaffected by mechanical vibration and shock.

Figure 1:
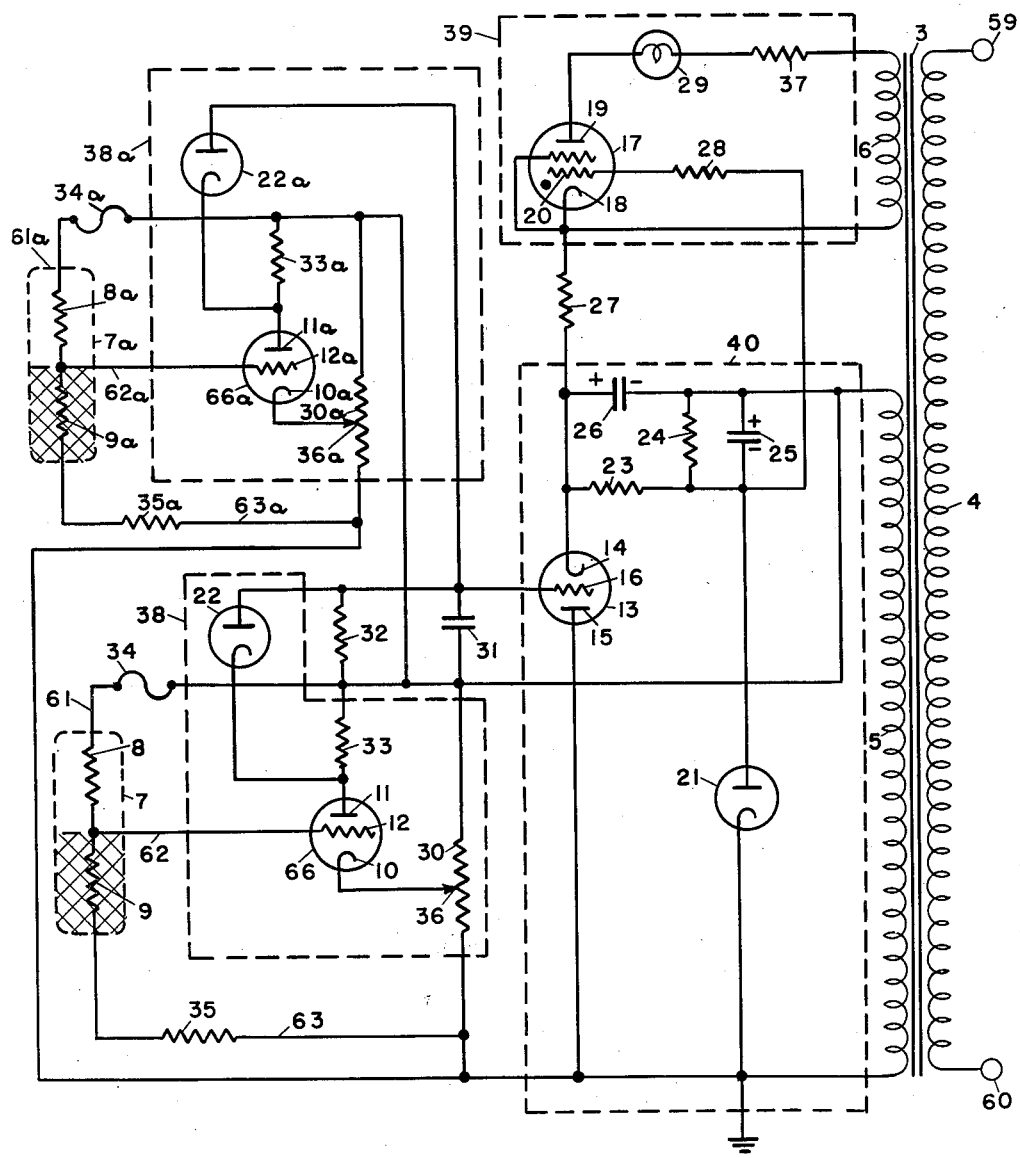
Fig. 1 illustrates, in electrical scheme, one embodiment of the invention.

In Fig. 1, the detecting photocell is indicated schematically by the dotted line 7, the resistances 8 and 9 representing the resistances of the open and masked areas of the semi-conductive film, respectively. Connected in series with the cell 7 is a thermally constant resistor 35. The two cell paths and the thermally constant resistor constitute a voltage divider network which controls the bias on grid 12 of amplifier tube 66. The control system is supplied with alternating current through a transformer 3, having a primary winding 4, which is connected to power terminals 59 and 60 and secondary windings 5 and 6. The transformer may carry an additional secondary winding (not shown) to supply power to the filaments of the vacuum tubes in the conventional manner. Voltage is applied to the plate circuit of tube 66 through resistance 36 which is connected across secondary 5. The signal derived from amplifier circuit 38 is applied to the grid 16 of a second vacuum tube 13 which forms a part of the balancing circuit 40. The current through tube 13 controls the bias of grid 20 of thyratron 17 which forms part of the output circuit 39. The plate voltage of the thyratron is supplied by secondary 6. The current through the thyratron energizes a signal lamp 29. If several detecting elements are required to supervise the danger zone in a particular installation, a number of additional cells may be used, each cell 7a having connected in series with it a thermally constant resistor 35a, and being connected as shown to its associated amplifier circuit 38a.

The components of amplifier circuits 38 and 38a, the balancing circuit 40, the output circuit 39, and the transformer, may all be mounted in a central housing to which the leads from the remotely mounted detector elements are brought in. The indicator lamp 29 may be mounted on the housing, or, optionally, on a remote indicator panel. A typical installation for a jet airplane, for example, consists of a number of detector elements mounted, together with their associated thermally constant resistors, in the space between the skin and the shroud. Each cell is subject both to ambient temperature rises at its location and to radiated heat from any point within a direct visual line to the exposed film area. A relatively small number of detectors will thus provide complete protection of the entire zone around the engine. The circuit components are mounted in a housing at any convenient location on the airplane, and the indicator lamp 29 is mounted on the instrument panel. Optical filters may be provided for restricting the response of the cell within a particular band of radiation frequencies.

The circuit shown in Fig. 1 operates as follows:

The cathode tap 36 is so adjusted that when the cell 7 is at normal temperature for the particular installation and receives no appreciable radiation, the bias applied between grid 12 and cathode 10 of tube 66 by the network consisting of resistances 8, 9 and 35 and the portion of resistance 30 below the tap, is sufficiently negative to render the tube nonconductive. No potential drop is present across resistance 33 and consequently no current flows across resistance 32 and its parallel-connected capacitance 31. Grid 16 of tube 13 is at substantially the potential of the upper end of secondary 5. Amplifier tube 13 and rectifier tube 21 are both conducting. The current through tube 13 charges capacitance 26 and the current through rectifier 21 charges capacitance 25, the polarity of the respective charges being as shown on the drawing. The bias on grid 20 of thyratron 17 is the sum of these two charges. Under the conditions just described, this bias is sufficiently negative to keep grid 20 below cut-off. No current flows in the plate circuit of the thyratron and the signal lamp 29 is de-energized.

When the exposed path of the cell 7, represented by resistance 8, receives infrared radiation above a given level of intensity from a hot body within its visual range, the resistance across this film path decreases, and the bias on grid 12 becomes less negative. Current flows through tube 66, giving rise to a potential drop across load resistance 33. This potential drop causes a rectified current to flow through resistance 32 and rectifier 22, and a charge is built up on capacitance 31. The charge is of such a polarity as to bias grid 16 negatively. Current through tube 13 is reduced, and part of the charge on capacitance 26 leaks off through resistances 23 and 24. The resulting reduction in the negative bias applied to grid 20 allows the thyratron 17 to fire and signal lamp 29 is energized. If multiple detectors are used, as indicated by the cell 7a and its associated circuit, radiation impinging on the exposed path (resistance 8a) of cell 7a causes tube 66a to become conductive. The potential drop across load resistance 33a then gives rise to a charge on capacitance 31 and causes signal lamp 29 to become energized. A number of additional detecting branches may be connected in parallel across resistance 32 and input capacitance 31, as shown, and current through any of the amplifier tubes 66, 66a, etc., resulting from a radiation impinging on the associated cell, will cause signal device 29 to become energized. The sensitivity of each detecting branch, that is, the level of radiation which will give rise to sufficient charge on capacitance 31 to operate the signal lamp, may be independently adjusted by means of cathode taps 36, 33a, etc.

Each detecting branch responds to excessive rise in the ambient temperature in the neighborhood of the associated cell. If the temperature of cell 7 is increased, for example, the resistances of the two film paths represented by resistances 8 and 9 are decreased equally. The magnitude of thermally constant resistance 35, however, is unaffected by the temperature rise, and as a consequence the decrease in resistance 8 is greater than the decrease in the combination of resistances 9 and 35. The potential of grid 12 with respect to cathode 10 therefore becomes less negative and current flows through tube 66, giving rise to a charge on capacitance 31. Signal lamp 29 then becomes energized, as previously described.

The balancing network 40 of Fig. 1 operates as follows:

When the line voltage increases, the resulting increase in the plate voltage across a current rectifier 21 causes an increase in current through the rectifier, and a larger charge is built up on capacitance 25. The plate voltage of tube 13 is also increased. It will be noted, however, that capacitance 25 is included in the biasing circuit between grid 16 and cathode 14. The increased charge on the capacitance 25 increases the negative bias of grid 16 and causes a reduction in current through tube 13. The charge on capacitance 26 is correspondingly reduced, and this reduction tends to compensate for the increase in the charge on capacitance 25 and maintain the net bias on grid 20 constant. The increased current through tube 66 resulting from the increase in plate voltage across that tube causes a larger charge to be built up on capacitance 31 and this aids in the stabilizing effect by further reducing the current through tube 13. Similarly, if the line voltage decreases, the charge on capacitance 25 becomes smaller. The charge on capacitance 26 becomes larger, however, because of the increased current through tube 13, the current increase being due to the decrease in the negative bias of grid 16 as the result of the lowering of the charge across capacitances 25 and 31.

Figure 2:
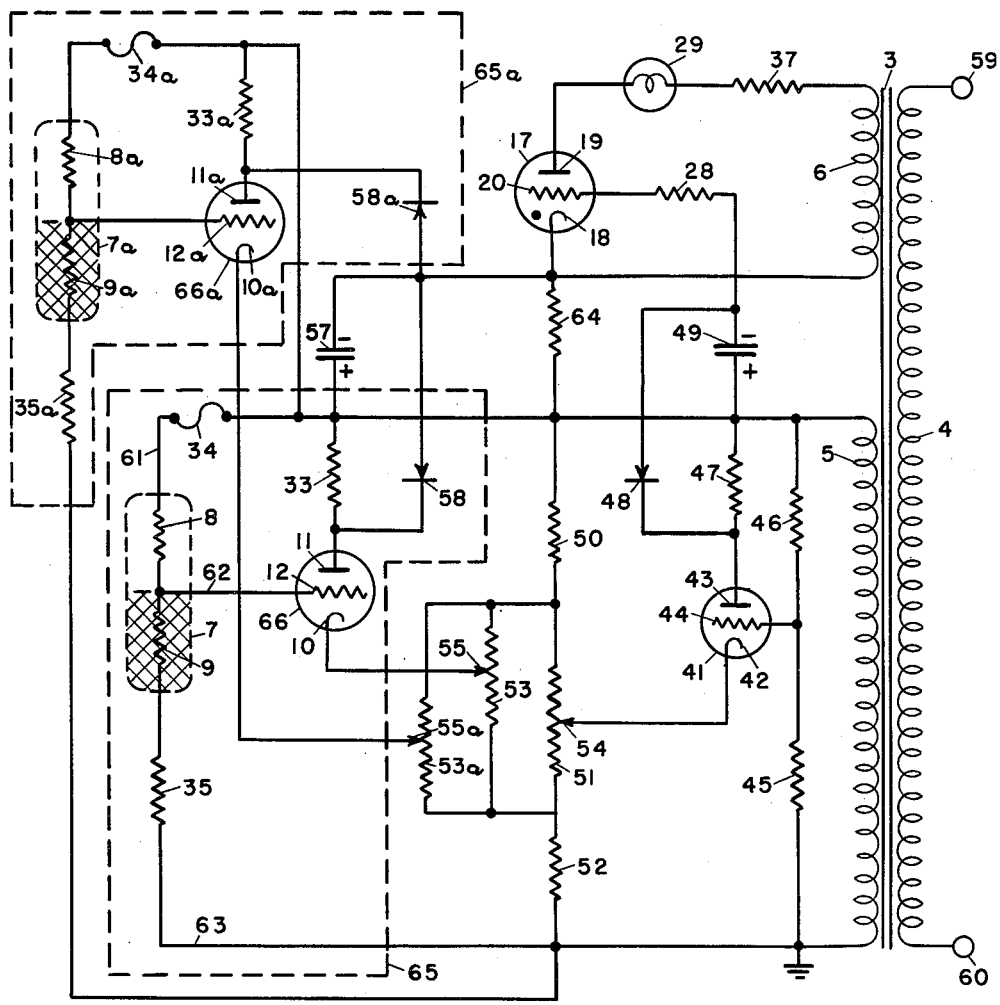
Fig. 2 illustrates an alternative circuit arrangement.

In the circuit of Fig. 2, the detecting branch 65 operates in much the same manner as the detecting circuit shown in Fig. 1. Like-numbered parts perform the same functions. The combination of resistances 50, 53, 54 and 52 in Fig. 2 are roughly equivalent to resistance 30 in Fig. 1 and supply the plate voltage to tube 66. Tap 55 provides sensitivity adjustments in the same manner as tap 36. Rectifier 58 may be a dry rectifier or a rectifier tube and is the equivalent of rectifier 22. When the negative bias on grid 12 is reduced as the result of either radiation impinging on the open area of cell 7 or a rise in ambient temperature which affects the magnitude resistances 8 and 9 but not that of thermally constant resistor 35, the current flowing through tube 66 gives rise to a potential drop across resistor 33. A charge is then built up on capacitance 57 through the circuit including the rectifier 58 and resistance 64. This charge is of such a polarity as to decrease the negative bias on grid 20 and allow thyratron 17 to fire. The signal lamp 29 is then energized. When the overheat condition ceases and cell 7 is restored to normal, the charge on capacitance 57 leaks off through resistance 64 and thyratron 17 ceases to conduct. It will be noted that the bias circuit for grid 20 includes capacitance 49. Balancing tube 41 is supplied with plate voltage from secondary 5 through the network consisting of resistances 50, 51, 52 and 53. A voltage dividing network consisting of the resistances 45 and 46 provides the bias for grid 44. The plate voltage and consequently the current through tube 41 may be adjusted by means of tap 54. In operation, tube 41 is conductive on every other half cycle. The resulting potential drop across load resistor 47 builds up a charge on capacitance 49 through rectifier 48. This charge is of polarity opposite to that of capacitance 57 and impresses a negative bias on grid 20. Line voltage fluctuations affect the charges on both capacitors. For example, if the line voltage increases, the current through both tubes 66 and 41 becomes larger and, as a result, a larger charge is built up on capacitors 57 and 49. Since the charges are of opposite polarity the increases tend to balance each other, and the bias on grid 20 is thus maintained relatively constant.

The circuit of Fig. 2, like that of Fig. 1, may be arranged to employ multiple detecting channels. Any number of resistors, each with an adjustable tap, may be connected in parallel with resistance 53, as illustrated by 53a with its tap 55a. Additional detecting branches as exemplified by the network 65a are then connected as shown. Each branch includes a detecting cell 7a with its associated thermally constant resistor 35a, an amplifier tube 66a, a load resistance 33a, and a rectifier 58a. Current through tube 66a results in a potential drop across resistance 33a which charges capacitance 57 and causes tube 17 to fire and energize signal lamp 29. The signal lamp will then be illuminated in response to either radiated heat or excessive ambient temperature rise affecting any one of the detecting cells.

It will be noted that each detecting branch is provided with a fuse 34 (or 34a). In practice, the detecting cells 7 and 7a, together with their associated thermally constant resistors, are remotely mounted and are connected to the amplifier circuit through a cable containing leads 61 and 62 (or 61a or 62a). The right hand ends of resistors 35 and 35a are grounded. If the cable is accidentally cut or shorted, fuse 34 (34a) will burn out and grid 12 becomes either floating or grounded. The tubes 66 (66a) are preferably of a type which goes to cut-off when the grid is floating. If the grid is grounded, the portion of resistance 30 (30a) below the tap, or, in Fig. 2, resistance 52 impresses a negative bias on grid 12, and maintains tube 66 (66a) nonconductive. In either case, the damaged channel ceases to give a signal across input capacitance 32 or 57, but the remaining channels will continue to operate as before. If the anode and grid leads of tube 66 should be shorted together on the power side of the fuse, the voltage on the grid becomes so high that most of the current flows through the grid circuit and the current through resistance 33 is insufficient to give rise to an overheat signal.

It is to be understood that the output circuit 39 may operate any desired control or alarm device, instead of, or in addition to, the signal lamp. For example, signal lamp 29 may be replaced by a relay which operates an automatic fire extinguisher.

The lead sulphide cells used with this device are not necessarily constructed so that both paths are of equal resistance and undergo the same change in resistance upon ambient temperature rise. The path represented by resistance 8, may, for example be longer, and therefore have a higher resistance, than the path represented by resistance 9. In this case, the cell itself yields a differential signal, since the change in resistance 8 upon ambient temperature rise is larger than the change in resistance 9 and the fixed resistance 35 may be dispensed with. Certain cells may give such a large differential signal that it is necessary to connect the fixed resistor in the branch of the circuit containing resistance 8, that is, between anode 11 and grid 12 to reduce the signal so that tube 66 starts to conduct at the desired ambient temperature level. The exact arrangement of the detecting unit and the magnitude of the various resistances used are determined according to the characteristics of the cell and the ambient temperature level at which an overheat indication is desired.

Since certain changes may be made in the above-identified article and different embodiments of the invention could be made without departing from the scope thereof, it is intended that all matter contained in the above description or shown in the accompanying drawings shall be in-

What is claimed is:

1. An electrical heat detection device comprising: a first source of electrical power; a first electron discharge device having an anode, cathode and control electrode; a detecting element connected to said first source having two consecutive resistance paths, the resistance of one being variable in response to radiated heat and the resistance of both being variable in response to temperature changes; a connection from the junction point of said paths to said control electrode; a first output circuit including said cathode, said anode, said first source, and a first load resistance; a first capacitance connected in parallel with said first load resistance; a second electron discharge device having an anode, a cathode and control electrode; a biasing network connected between the cathode and control electrode of said second discharge device; means for impressing any charge stored by said first capacitance on said network so as to influence the biasing potential applied thereby to said second discharge device; a second source of electrical power; a second output circuit including said second source, and the anode and cathode of said second discharge device; and electrically energizable operator means connected in said second output circuit.

2. A device according to claim 1 wherein a third electron discharge device having an anode, cathode, and control electrode, has connected between its anode and cathode said first source, a second load resistance, and in parallel with said second load resistance a second capacitance; said second capacitance forming part of said biasing network.

3. A device according to claim 2 having a rectifier connected across said first source in series with said parallel connected second capacitance and second load resistance, a third capacitance connected between one end of said second capacitance and the cathode of said third discharge device, a third load resistance connected between said last-named cathode and the other end of said second capacitance, the cathode and control electrode of said second discharge device being connected to the ends of said second and third capacitances away from their junction point, and said first capacitance being connected between the cathode and control electrode of said second discharge device so as to control the bias thereof.

4. A device according to claim 2, said first and second capacitances being connected in series between the cathode and control electrode of said second discharge device.

5. An electrical heat detection device comprising, three serially-connected impedance elements, the first and second of said impedance elements having substantially the same temperature coefficient of impedance, the first of said elements being capable of translating impinging radiant energy into an impedance variation, the second of said elements being nonresponsive to said radiant energy impedancewise, the third of said elements having a substantially different temperature coefficient of impedance than that of said first and second impedance elements, means for applying an electrical potential to said serially-connected impedance combination, and means for applying the potential appearing across a portion of said serially-connected network to the input of an electronic amplifier whereby a substantial output signal is developed whenever radiant energy impinges upon said first impedance element or the ambient temperature of said first and second impedance elements exceeds a maximum allowable value.

6. An electrical heat detection device comprising, three serially-connected impedance elements, the first and second of said impedance elements having substantially the same temperature coefficient of impedance, the first of said elements being capable of translating impinging radiant energy into an impedance variation, the second of said elements being nonresponsive to said radiant energy impedancewise, the third of said elements having a substantially different temperature coefficient of impedance than that of said first and second impedance elements, means for applying a substantially constant value electrical potential to said serially-connected impedance combination, and means for applying the potential appearing across a portion of said serially-connected network to the input of an electronic amplifier whereby a substantial output signal is developed whenever radiant energy impinges upon said first impedance element or the ambient temperature of said first and second impedance elements exceeds a maximum allowable value.

7. An electrical heat detection device comprising, three serially-connected impedance elements, the first and second of said impedance elements having substantially the same temperature coefficient of impedance, the first of said elements being photoconductive, the second of said elements being nonresponsive impedancewise to a portion of the radiation spectrum to which said first element is responsive, the third of said elements having a different coefficient of impedance than that of said first and second impedance elements, means for applying an electrical potential to the end terminals of said serially-connected impedance combination, and means for applying the potential appearing across a portion of said serially-connected network to the input of an electronic amplifier whereby a substantial output signal is developed whenever radiant energy impinges upon said first impedance element or the ambient temperature of said first and second impedance elements exceeds a maximum allowable value.

8. An electrical heat detection device comprising, three serially-connected impedance elements, the first and second of said impedance elements having substantially the same temperature coefficient of impedance, the first of said elements being photoconductive, the second of said elements being nonresponsive impedancewise to the radiant energy to which said first element is responsive, the third of said elements having a substantially different temperature coefficient of impedance than that of said first and second impedance elements and also being nonresponsive to said radiant energy impedancewise, means for applying an electrical potential to the end terminals of said serially-connected impedance combination, and means for applying the potential appearing across a portion of said serially-connected network to the input of an electronic amplifier whereby a substantial output signal is developed whenever radiant energy impinges upon said first impedance element or the ambient temperature of said first and second impedance elements exceeds a maximum allowable value.

9. An electrical heat detection device comprising, three serially-connected impedance elements, the first and second of said impedance elements having substantially the same negative temperature coefficient of impedance, the first of said elements being capable of translating impinging radiant energy into an impedance variation, the second of said elements being nonresponsive to said radiant energy impedancewise, the third of said elements having a substantially zero temperature coefficient of impedance and being nonresponsive to said radiant energy impedancewise, means for applying an electrical potential to the end terminals of said serially-connected impedance combination, and means for applying the potential appearing across said second and third impedance elements to the input of an electronic amplifier whereby a substantial output signal is developed whenever radiant energy impinges upon said first impedance element or the ambient temperature of said first and second impedance elements exceeds a maximum allowable value.

PHILLIP J. CADE.
DONALD J. MacDOUGALL.

REFERENCES CITED

The following references are of record in the file of this patent:

UNITED STATES PATENTS

| Number | Name | Date |
| --- | --- | --- |
| 755,840 | Bose | Mar. 29, 1904 |
| 1,936,514 | Lengnick | Nov. 21, 1933 |
| 2,408,051 | Donelian | Sept. 24, 1946 |
| 2,465,377 | Jaeger | Mar. 29, 1949 |
| 2,507,359 | Weisz | May 9, 1950 |
| 2,553,420 | McFee | May 15, 1951 |

FOREIGN PATENTS

| Number | Country | Date |
| --- | --- | --- |
| 351,468 | Great Britain | June 24, 1931 |